Patented Oct. 1, 1935

2,016,257

UNITED STATES PATENT OFFICE 2,016,257

PROCESS OF MANUFACTURING N-CHLORO-AZO-DICARBONAMIDINES

Franz C. Schmelkes, Bloomfield, and Henry C. Marks, Belleville, N. J., assignors to Wallace & Tiernan Products, Inc., Belleville, N. J., a corporation of New Jersey No Drawing. Application March 17, 1934, Serial No. 716,218

10 Claims. (Cl. 260—86)

This invention has for its object the production of N-chloro-azo-dicarbonamidines, and more particularly NN'-dichloro-azo-dicarbonamidine. This last named substance will, for convenience, be hereinafter referred to as N. D. A. N. D. A. is a stable compound having very definite characteristics which make it especially useful as a bactericide in the presence of oxidizable organic matter.

From the formulæ of the materials from which N. D. A. may be prepared, the chemical analysis of N. D. A. and its chemical properties, the structural formula of N. D. A. appears to be:

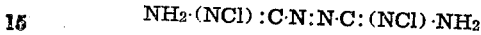

$NH_2 \cdot (NCl) : C \cdot N : N \cdot C : (NCl) \cdot NH_2$

Whatever its structural formula may be, its empirical formula is $C_2N_6H_4Cl_2$ and it has the following properties:

It forms yellow to orange colored crystals of needle or cube-like shape. Its solubility in water at 0° C. is about 200 parts per million. Solutions of the above strength are strongly yellow, and this color is still quite marked at much lower concentrations.

N. D. A. is soluble in almost all organic solvents with the exception of saturated hydrocarbons such as petroleum ether, and their chlorinated derivatives such as carbon tetrachloride and chloroform. It is particularly easily soluble in ether and ester derivatives of the glycols and in ketones. On heating it decomposes around 156° C. without previously melting.

It is odorless, and its solution is almost tasteless and produces almost no irritation if used judiciously on and about the body.

It is highly selective as a bactericide in the presence of oxidizable organic matter, and its usefulness is due largely to this characteristic property. Under conditions where the available chlorine in other chlorine compounds is rapidly consumed and made unavailable for bactericidal purposes, the available chlorine in N. D. A. does not react with the organic matter present, or only very slightly so, and remains available for action upon bacteria.

In addition to the above, N. D. A. has the important property of being among the most stable compounds containing bactericidal chlorine. This is indicated, among other things, by the fact that it does not decompose until heated to 156° C. As it is a solid of innocuous properties it can be shipped in simple containers.

N. D. A. per se and its application for killing bacteria, as applied in the sterilization of liquids, solids, vessels, implements, wounds, etc., is disclosed and claimed in the co-pending application Serial No. 684,121, which has matured into U. S. Patent No. 1,958,370, granted May 8, 1934.

We have discovered that N. D. A. may be prepared from guanidine or a salt thereof by treating such compound with a compound containing the radical —OCl or with chlorine or substances, such as N-N-dichloro-urea, which contain chlorine sufficiently loosely combined to liberate iodine from neutral iodides. For various reasons, including not only lower reagent cost but also higher yield of N. D. A., hypochlorites or chlorine are preferred to such compounds as N-N-dichloro-urea. Hypochlorites are preferred to chlorine on account of greater convenience in handling, shipment, etc.

Using hypochlorites, the reaction is somewhat as follows:

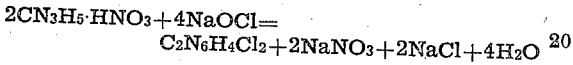

$2CN_3H_5 \cdot HNO_3 + 4NaOCl =$
$C_2N_6H_4Cl_2 + 2NaNO_3 + 2NaCl + 4H_2O$

Other products, such as nitrogen trichloride, carbonic acid and ammonium salts, are formed to a minor extent in addition to those shown by the above equation, even when the conditions for optimum yield of N. D. A. are observed.

It will be noted that the theoretical proportions of guanidine salt to hypochlorite are one mol. of the former to two mols of the latter. In practice, a small excess of hypochlorite is used. If the quantity of hypochlorite is decreased, instead of forming a monochloro compound, a smaller amount of dichloro product or N. D. A. is produced.

It is possible to form a trichloro compound either by treating the guanidine salt with large excess of hypochlorite or by treating the dichloro compound with hypochlorite. The trichloro compound is an amorphous orange colored substance only slightly soluble in water. It is considerably less stable than the dichloro product and to that extent less desirable.

A salt of guanidine is used in preference to guanidine itself for a variety of reasons. In the first place, guanidine is a very strong base and its solution is so caustic that it attacks the skin. It is also deliquescent and has other undesirable qualities that are not possessed by its salts, at least to the same degree. In the second place, the reaction with hypochlorite proceeds with maximum efficiency in a solution having a pH around 5, whereas free guanidine would render the solution strongly alkaline. Further, the reaction between free guanidine and sodium hypochlorite results in the formation of caustic soda, which would render the solution still more alkaline.

The relationship between the pH and the yield of N. D. A. is shown by the following table giving the yield obtained by treating guanidine nitrate with a slight excess of sodium hypochlorite at a temperature of around 0° C.:

| pH | Yield N. D. A. |
|---|---|
|  | Percent |
| 3.0 | 11 |
| 3.5 | 25 |
| 4.0 | 39 |
| 4.5 | 52 |
| 5.0 | 61 |
| 5.5 | 53 |
| 6.0 | 32 |
| 6.5 | 10 |
| 7.0 | 4 |

In view of the importance of controlling the pH, it is advisable to use a buffer, such as a mixture of acetic acid and sodium acetate, to facilitate holding the pH constant, especially during the first part of the reaction. Any tendency for the pH to change may be observed by a recording potentiometer in conjunction with a glass electrode and may be counteracted by the addition of the requisite amount of alkali or acid.

In addition to controlling the pH, it is also desirable to control the temperature of the reacting solutions. The solutions should be cold, the nearer to 0° C. the better.

By way of example, one suitable method of preparing N. D. A. is to add 8.5 kilos of guanidine nitrate, 106 grams of acetic acid and 560 grams of sodium acetate to 50 kilos of water and violently agitate to produce a suspension of guanidine nitrate in an acid solution of sodium acetate. The mixture is cooled to 0° C. and maintained at that temperature during the entire reaction period. The desired low temperature is best maintained by immersing in the reaction mixture a silver coil through which cooled brine is circulated. To the mixture, while in constant agitation, is slowly added 110 liters of 10% sodium hypochlorite. The rate of addition of the hypochlorite should be such that the heat developed is never in excess of that which can be carried away by the silver cooling coil. By means of a glass electrode, pH determinations are made continuously; and by the addition of hypochloric acid or caustic soda, as the case may be, the pH is maintained as near to 5 as possible. This maintenance of pH is greatly facilitated by the acetic acid-acetate buffer.

In view of the fact that N. D. A. is soluble in water at 0° C. only to the extent of about 1 part in 5000, after this concentration is reached, N. D. A. is precipitated as fast as it is formed. As the guanidine nitrate in solution is converted into N. D. A., more guanidine nitrate goes into solution so that at the end of the reacting period the insoluble material in suspension consists practically wholly of N. D. A. The N. D. A. may then been readily separated from the mother liquor by filtration or centrifuging.

Using the quantities of materials mentioned above, about 4 kilos of N. D. A. should be obtained. The N. D. A. is impure to the extent that it contains some absorbed salt. This small quantity of salt can be readily removed by simple recrystallization and a product obtained which is practically 100% pure.

The process outlined above may be varied in numerous ways. Thus, other guanidine salts than the nitrate may be used, both inorganic and organic, such as the sulphate or acetate. The radicals of some acids, however, react with sodium hypochlorite so that large excess of the latter is required to produce the requisite N. D. A. after reacting with such radicals. Thiocyanic acid is an example of an acid having a radical which reacts with hypochlorites.

The proportion of guanidine salt to water may be varied, but the lower this proportion the greater the loss of N. D. A. by solution in the mother liquor. For the same reason, the solution of sodium hypochlorite should be reasonably strong. On the other hand, if the concentration of the two reagents is unduly increased, the yield suffers because of side reactions which are unavoidable if, due to the high concentration, local over-concentration is obtained in spite of violent agitation. Ordinarily, the proportion of guanidine salt to water should be between 1 and 25 parts, or better still 5 to 20 parts, of the former to 100 of the latter.

In place of sodium hypochlorite, other alkali metal or alkaline earth metal hypochlorites may be used or the materials from which such hypochlorites are prepared—alkali metal or alkaline earth metal hydroxide and chlorine—can be added separately to the reaction mixture.

Also other compounds both organic and inorganic containing the radical —OCl may be used as well as chlorine alone, which reacts with water to give HOCl.

If a substance of the type of N-N-dichloro-urea is used, the reaction proceeds much more slowly and the yield for reaction times of reasonable duration is much less than with hypochlorites. For example, if 23.4 kilos of N-N-dichloro-urea is added to a solution or suspension of 11.3 kilos of guanidine sulphate, 7.4 kilos of acetic acid and 22.7 kilos of sodium acetate in 50 kilos of water at a temperature of around 0° C., about 1 kilo of N. D. A. is formed in 24 hours.

What is claimed is:

1. The process of preparing an N-chloro-azodicarbonamidine, which comprises the step of chlorinating a compound of the group consisting of guanidine and salts thereof by a substance of the group consisting of chlorine and substances containing chlorine sufficiently loosely combined to liberate iodine from neutral iodides, the chlorination taking place in a slightly acid solution.

2. The process of preparing an N-chloro-azodicarbonamidine, which comprises the step of chlorinating a compound of the group consisting of guanidine and salts thereof by a substance of the group consisting of chlorine and substances containing chlorine sufficiently loosely combined to liberate iodine from neutral iodides, the chlorination taking place in a slightly acid aqueous solution at a temperature below 10° C.

3. The process of preparing an N-chloro-azodicarbonamidine, which comprises the step of chlorinating a compound of the group consisting of guanidine and salts thereof by a substance of the group consisting of chlorine and substances containing chlorine sufficiently loosely combined to liberate iodine from neutral iodides, the chlorination taking place in slightly acid aqueous solution in the presence of a buffer to aid in the control of the pH of such solution.

4. The process of preparing an N-chloro-azodicarbonamidine, which comprises the step of chlorinating a slightly acid aqueous solution of a compound of the group consisting of guanidine and salts thereof by slowly adding thereto a substance of the group consisting of chlorine and substances containing chlorine sufficiently loosely combined to liberate iodine from neutral iodides and simultaneously agitating the mixture.

5. The process of preparing an N-chloro-azo-dicarbonamidine, which comprises the step of chlorinating a compound of the group consisting of guanidine and salts thereof by a compound having the radical —OCl, the chlorination taking place in an aqueous solution having a pH between 6.5 and 3.

6. The process as claimed in claim 5, in which the pH is between 6 and 4.

7. The process as claimed in claim 2, in which the temperature is below 5° C.

8. The process of preparing NN'-dichloro-azo-dicarbonamidine, which comprises chlorinating an inorganic salt of guanidine by an alkali-forming metal hypochlorite in the proportion of one mol of the former to at least two of the latter in an aqueous solution having a pH between 6 and 4 and at a temperature below 10° C.

9. The process as claimed in claim 8, in which the proportion of guanidine salt to water by weight is between 1 and 25 parts of the former to 100 of the latter.

10. The process as claimed in claim 8, in which the proportion of guanidine salt to water by weight is between 5 and 20 parts of the former to 100 of the latter.

FRANZ C. SCHMELKES.
HENRY C. MARKS.